Patented Mar. 29, 1932

1,851,411

UNITED STATES PATENT OFFICE

MARK SHOELD, OF MOUNT LEBANON TOWNSHIP, ALLEGHENY COUNTY, PENNSYLVANIA, ASSIGNOR TO THE KOPPERS COMPANY, A CORPORATION OF DELAWARE

SULPHUR PURIFICATION

No Drawing.   Application filed April 26, 1929.   Serial No. 358,426.

This invention relates to sulphur and methods of improving its quality and more particularly to the removal of certain impurities therefrom to render it more suitable for agricultural purposes.

In the purification of fuel gases (including coal gas, water gas, oil gas, and natural gas), hydrogen sulphide, hydrogen cyanide and other impurities are removed by an absorbent liquid, and sulphur is liberated when the thereby fouled liquid is aerated or actified for the purpose of regenerating it for further use. Examples of such purification processes are described in copending applications Serial No. 146,569 and Serial No. 146,571, filed November 5, 1926, and Serial No. 173,614, filed March 7, 1927.

Various absorbing liquids are mentioned in these applications, as for instance solutions of alkaline earth metal compounds of metals of the tin group, or solutions of thio-arsenic compounds of alkali metals, or alkaline solutions of compounds of metals of the tin group. Among these may also be included the well known alkaline solutions containing metallic compounds, such as iron oxide, nickel sulphide, and the like, which are used in cyclic gas purification processes for sulphur which is removed in elemental form in the actification stage.

An object of this invention is to provide a free flowing sulphur dust particularly from sulphur obtained in the above and similar processes.

A further object is to prepare an improved sulphur which is very effective as an insecticidal, germicidal or fungicidal agent.

A still further object is to provide a process for preparing a sulfur free from ingredients which are harmful to cultivated plants.

The crude sulphur separated by filter presses or other means as a by-product from the above gas purification processes, contains about 40 to 50% of sulphur. The balance is a water solution of sodium salts, principally thiosulphates and thiocyanates and in some cases arsenates and arsenites. The thiocyanates are especially detrimental from an agricultural standpoint due to the fact that they have a destructive effect on leaves and twigs. It is therefore essential to remove, or render these constituents harmless to cultivated plants.

Besides having the destructive property, the thiocyanates present in the foul absorbing liquids mentioned above and adhering to the sulphur, are also very hygroscopic and in preparing a dry dusting sulphur, the presence of these substances is very undesirable.

Sulphur obtained in the above gas purification processes is partially of colloidal dimensions and has a considerable adsorptive power towards the salts present and it is difficult to remove all the salts by a simple washing.

In the process of this invention, both the adsorbed thiocyanates as well as those which are freely intermingled with the sulphur are rendered harmless.

In accordance with the process of this invention, the by-product gas-house sulphur is mixed with water to form a slurry and a reagent is added which forms an insoluble precipitate with the thiocyanates. The insoluble thiocyanates formed may be removed, as by settling, or they may be permitted to remain in the sulphur.

Examples of reagents which may be used for precipitating the thiocyanates, are salts of such metals as copper, silver, lead, and others. Preferably the more soluble salts are used, such as the nitrates or acetates, of any of the metals mentioned, or a sulphate as in the case of copper. These reagents may be used in solutions or in dry form.

A preferred method of purifying a gas-house sulphur is as follows:

The sulphur paste as it comes from the gas plant is mixed with water to form a slurry containing about 7 to 10% of sulphur. The temperature of the water is kept above 70° F. or preferably around 100° F.

This slurry is filtered and the moist sulphur cake is repulped with water at about the same temperature to form a slurry of the same consistency as the above.

A small amount of copper sulphate solution is now added to the slurry and mixed therewith and the thiocyanates are precipitated in the form of cuprous thiocyanate. The amount of precipitating reagent added is preferably slightly in excess of the amount needed to change all the thiocyanates from soluble to insoluble or from harmful compounds to those which are harmless to cultivated plants. The treated sulphur is separated out by filtration and if a sulphur paste is desired the material is ready for use.

If a dusting sulphur is wanted, the treated sulphur is dried at a temperature preferably not exceeding 180° F.

In the process of this invention, a by-product gas-house sulphur of high quality is produced. The process is simple and yet very effective and the treated sulphur is free from impurities which have the objectionable properties mentioned above.

I claim as my invention:

1. In a process of purifying sulphur containing thiocyanates, the step of treating sulphur to change soluble thiocyanates present in the sulphur mass, to insoluble thiocyanates.

2. In a process of treating by-product gas-house sulphur, the step of treating the sulphur with a solution of copper sulphate to change the thiocyanates present in the sulphur mass, to cuprous thiocyanate.

3. A process of treating sulphur containing thiocyanates, which comprises mixing the sulphur with water and adding to the mixture a reagent which will change thiocyanates present in the mixture and render the thiocyanates harmless to cultivated plants.

4. A process of treating sulphur obtained as a by-product in the purification of fuel gases, which comprises mixing the by-product sulphur with water and adding a salt of a metal which will react with thiocyanates present in the sulphur to form insoluble thiocyanate.

5. A process of treating sulphur obtained as a by-product in the purification of fuel gases, which comprises mixing the by-product sulphur with water and adding copper sulphate to change thiocyanates present in the sulphur to cuprous thiocyanate.

6. A process of treating sulphur obtained as a by-product in the purification of fuel gases, which comprises mixing the by-product sulphur with water, keeping the temperature of the water at about 100° F., removing the solid matter from the liquid, adding water to the said solid matter, and adding a salt of a metal which will react with thiocyanate present in the sulphur, to form insoluble thiocyanate.

7. A process of treating sulphur obtained as a by-product in the purification of fuel gases, which comprises mixing the by-product sulphur with water to form a slurry, keeping the temperature of the water at about 100° F., removing the solid matter from the liquid, adding water to the said solid matter to form a slurry, keeping the temperature of the second slurry at about 100° F., adding copper sulphate to change thiocyanates present in the sulphur to cuprous thiocyanate, and drying the sulphur thus treated.

8. A free-flowing sulphur dust containing water-insoluble thiocyanates.

9. A process of treating sulphur obtained as a by-product in the purification of fuel gases, which process comprises mixing the said by-product sulphur with water to dissolve water-soluble matter which is present in the said sulphur and which is harmful to cultivated plants, and adding to the resulting mixture a water-soluble metal compound which will react with the said matter to form compounds which are harmless to cultivated plants.

In testimony whereof I have hereunto subscribed my name this 24th day of April, 1929.

MARK SHOELD.